(12) United States Patent
Hutchinson et al.

(10) Patent No.: US 11,618,551 B2
(45) Date of Patent: Apr. 4, 2023

(54) NOISE MITIGATION SYSTEM FOR AN UNDUCTED PROPULSIVE ROTOR OF AN AIRCRAFT

(71) Applicant: Rolls-Royce plc, London (GB)

(72) Inventors: Samuel O Hutchinson, Derby (GB); Andrew Smyth, Derby (GB)

(73) Assignee: ROLLS-ROYCE PLC, London (GB)

( * ) Notice: Subject to any disclaimer, the term of this patent is extended or adjusted under 35 U.S.C. 154(b) by 283 days.

(21) Appl. No.: 17/188,456

(22) Filed: Mar. 1, 2021

(65) Prior Publication Data
US 2021/0276692 A1 Sep. 9, 2021

(30) Foreign Application Priority Data
Mar. 6, 2020 (GB) ...................................... 2003264

(51) Int. Cl.
*B64C 11/30* (2006.01)
*F02C 7/24* (2006.01)

(52) U.S. Cl.
CPC .......... *B64C 11/30* (2013.01); *B64C 2220/00* (2013.01); *F02C 7/24* (2013.01)

(58) Field of Classification Search
CPC ....... B64C 11/30; B64C 2220/00; F02C 7/24; B64D 33/00
See application file for complete search history.

(56) References Cited

U.S. PATENT DOCUMENTS

| | | | | |
|---|---|---|---|---|
| 9,205,915 | B2 * | 12/2015 | Feyzeau | G05D 1/0676 |
| 10,933,977 | B2 * | 3/2021 | Gartenberg | B64C 11/06 |
| 11,312,478 | B2 * | 4/2022 | Palumbo | B64C 11/50 |
| 2006/0111818 | A1 | 5/2006 | Ishii et al. | |

FOREIGN PATENT DOCUMENTS

| | | |
|---|---|---|
| GB | 2406884 A | 4/2005 |
| WO | 2018/208889 A1 | 11/2018 |
| WO | 2019/232535 A1 | 12/2019 |

* cited by examiner

*Primary Examiner* — Richard M Camby
(74) *Attorney, Agent, or Firm* — Oliff PLC (57) ABSTRACT

A noise mitigation system for an aircraft comprises a cyclic pitch mechanism arranged to apply a cyclic pitch schedule to rotor blades of an unducted propulsive rotor (UPR) under control of a processor. The processor receives input data corresponding to the position and attitude of the UPR, the position of one or more ground points stored in a memory and the velocity of the aircraft. If the processor determines that a ground point will enter the plane of the UPR, a control signal is output to the cyclic pitch mechanism as necessary to adjust the phase of the cyclic pitch schedule such that the azimuthal position of the ground point on entry to the plane of the UPR lies within an azimuthal interval over which the blade pitch of the cyclic pitch schedule is below its average value, thus reducing noise in the direction of the ground point.

15 Claims, 6 Drawing Sheets

Azimuthal position ψ of rotor blade (radians)

NOISE MITIGATION SYSTEM FOR AN UNDUCTED PROPULSIVE ROTOR OF AN AIRCRAFT

CROSS-REFERENCE TO RELATED APPLICATIONS

This application claims priority pursuant to 35 U.S.C. 119(a) of United Kingdom Patent Application No. 2003264.5, filed Mar. 6, 2020, which application is incorporated herein by reference in its entirety.

TECHNICAL FIELD

The invention relates to mitigation of aircraft noise, particularly mitigation of noise created by unducted propulsive rotors (UPRs) of an aircraft.

BACKGROUND

Hybrid and electric aircraft propulsion technologies have the capability to reduce fossil fuel use, $CO_2$ emissions, operating costs and noise footprint compared to conventional aircraft. Such aircraft typically employ unducted propulsive rotors (UPRs). For example a distributed propulsion arrangement for such an aircraft might employ many unducted propulsive rotors (UPRs). The management of noise generated by UPRs rotors of an aircraft, including community noise and cabin noise, is a non-trivial problem however, and is a major design issue for such aircraft. Design requirements, including thrust requirements, for a UPR place constraints on rotor RPM (angular velocity), blade pitch, air speed and other factors, which individually or collectively affect the noise generated by the UPR. In order to reduce community noise at a given location it is generally not desirable to adjust RPM as the resulting changes in tone are particularly noticeable to people on the ground. The noise generated by a UPR and experienced on the ground or on board the aircraft may be required to be managed, irrespective of how the UPR is powered.

BRIEF SUMMARY

A first aspect of the present invention provides a noise mitigation system for an unducted propulsive rotor of an aircraft, wherein the system comprises:
  a cyclic pitch mechanism arranged to apply a cyclic pitch schedule to rotor blades of the unducted propulsive rotor, the phase of the cyclic pitch schedule being adjustable and the blade pitch of the cyclic pitch schedule being below the average value thereof over a first azimuthal interval with respect to the rotor axis of the unducted propulsive rotor;
  a positioning and attitude system arranged to determine the position and attitude of the unducted propulsive rotor;
  a memory storing the position of a ground point; and
  a processor arranged to carry out the steps of:
  (i) receiving input data corresponding to the position and attitude of the unducted propulsive rotor and the position of the ground point from the positioning and attitude system and the memory respectively;
  (ii) receiving input data corresponding to the velocity of the aircraft;
  (iii) determining from the input data that the ground point will enter the rotor plane of the unducted propulsive rotor after a time period greater than or equal to the reaction time of the system and calculate the radial and azimuthal coordinates of the position in the rotor plane at which the ground point will enter the rotor plane with respect to the rotor axis of the unducted propulsive rotor; and
  (iv) outputting a control signal to the cyclic pitch mechanism as necessary to adjust the phase of the cyclic pitch schedule such that the first azimuthal interval includes the azimuthal coordinate determined in step (iii).

By adjusting the phase of the cyclic pitch schedule such that the first azimuthal interval includes the azimuthal coordinate of the ground point on entry to the plane of the UPR, the noise level at the ground point is arranged to be below the average noise level for all azimuthal positions with respect to the rotor axis of the UPR.

Preferably the processor is arranged to output a control signal to the cyclic pitch mechanism to adjust the phase of the cyclic pitch schedule such that the azimuthal position of the minimum blade pitch of the cyclic pitch schedule is equal to the azimuthal coordinate determined in step (iii) so that the noise level at the ground point is minimised when it enters the rotor plane of the UPR.

The memory may store threshold data corresponding to a threshold noise value associated with the ground point and the processor may be arranged to carry out the steps of:
  (v) receiving the threshold data;
  (vi) generating a calculated noise level for the ground point using at least the radial coordinate of the position at which the ground point will enter the rotor plane; and
  (vii) comparing the calculated noise level to the threshold noise value;
and outputting the control signal to the cyclic pitch mechanism if the calculated noise value exceeds the threshold noise value. In this case the phase of the cyclic pitch schedule is adjusted only if the calculated noise level for the position of the ground point on entry to the plane of the UPR exceeds the threshold noise value. For example if the aircraft is operating at high altitude then the phase of the cyclic pitch schedule is not adjusted.

The memory may store the positions of each of a plurality of ground points, the processor being arranged to carry out the steps of:
  (i) receiving input data corresponding to the positions of each of the ground points;
  (ii) determining two or more grounds points which will simultaneously enter the rotor plane of the unducted propulsive rotor after a time period greater than or equal to the reaction time of the system;
  (iii) calculating the radial and azimuthal coordinates of the respective positions in the rotor plane at which each of the two or more ground points will enter the rotor plane with respect to the rotor axis of the unducted propulsive rotor; and
  (iv) outputting a control signal to the cyclic pitch mechanism as necessary to adjust the phase of the cyclic pitch schedule such that the first azimuthal interval includes the azimuthal coordinate of each of the positions.

The noise level at two or more grounds points which enter the rotor plane of the UPR simultaneously may thereby be mitigated or reduced.

The memory may store the positions of each of a plurality of ground points and threshold data corresponding to noise threshold values each of which corresponds to a respective ground point, the processor being arranged to carry out the steps of:
  (i) receiving input data corresponding to the positions of each of the ground points and the threshold data;

(ii) determining two or more grounds points which will simultaneously enter the rotor plane of the unducted propulsive rotor after a time period greater than or equal to the reaction time of the system;

(iii) calculating the radial and azimuthal coordinates of the respective positions in the rotor plane at which each of the two or more ground points will enter the rotor plane with respect to the rotor axis of the unducted propulsive rotor;

(iv) for each of the positions determined in step (ii) generating a respective calculated noise level using at least the radial coordinate of the position;

(v) for each position comparing the calculated noise level and the threshold noise level and determining that position for which the calculated noise level exceeds the threshold noise level to the greatest extent; and (vi) outputting the control signal to the cyclic pitch mechanism such that the azimuthal position of the minimum blade pitch of the cyclic pitch schedule is equal to the azimuthal coordinate of the positioned determined in step (v).

In this case the azimuthal position corresponding to the minimum blade pitch of the cyclic noise schedule is arranged to coincide with (i.e. is steered in the direction of) the azimuthal position in the plane of the UPR of that ground point for which the noise threshold level is exceeded to the greatest extent.

Activation of the cyclic pitch mechanism by the control signal output by the processor may change the blade pitch of the UPR from a constant collective pitch value to the cyclic pitch schedule the average value of which is equal to the collective pitch value, such that the propulsive thrust of the UPR remains at least approximately unchanged. Alternatively the cyclic pitch mechanism may continuously apply a cyclic pitch schedule to the rotor blades of the UPR, with only the phase of the cyclic pitch schedule being controlled by the processor and not the maximum deviation of the blade pitch from its average value.

The processor and memory may be located remotely from the UPR and the cyclic pitch mechanism, the system further comprising means for wireless communication between the positioning and attitude system and the processor and between the processor and the cyclic pitch mechanism. For example the processor and memory may be located on the ground, with only the UPR, the cyclic pitch mechanism and the positioning and attitude system being located on board an aircraft mounting the UPR.

A second aspect of the invention provides an aircraft comprising a noise mitigation system according to the first aspect in which the processor, memory, positioning and attitude system, cyclic pitch mechanism and unducted propulsive rotor are comprised in the aircraft.

The processor may be arranged to adjust the phase of the cyclic pitch schedule such that the first azimuthal interval includes an azimuthal position corresponding to a position vector from the rotor axis of the unducted propulsive rotor in the rotor plane thereof to a point on the central longitudinal axis of the fuselage of the aircraft when the altitude of the aircraft is greater than a threshold altitude value. This reduces the noise experienced by passengers on board the aircraft in cases where community or ground noise is not required to be mitigated, for example when the aircraft is operating at high altitude.

Preferably the processor is arranged to adjust the phase of the cyclic pitch schedule such that the azimuthal position of the minimum blade pitch of the unducted propulsive rotor corresponds to a position vector from the rotor axis of the unducted propulsive rotor in the rotor plane thereof to a point on the central longitudinal axis of the fuselage of the aircraft, when the altitude of the aircraft is greater than the threshold altitude value, so that noise generated by the UPR and experienced by passengers is minimised in circumstances where ground noise or community noise is not required to be mitigated.

A third aspect of the invention provides a method of mitigating noise generated by an unducted propulsive rotor (UPR) of an aircraft, the method comprising the steps of:

(i) identifying a ground point which will enter the rotor plane of the UPR;

(ii) determining the azimuthal coordinate of the position in the rotor plane at which the ground point will enter the rotor plane with respect to the rotor axis of the UPR;

(iii) applying a cyclic pitch schedule to rotor blades of the UPR and controlling the phase of the cyclic pitch schedule as necessary such that an azimuthal interval over which the blade pitch of the cyclic pitch schedule is below the average value thereof includes the azimuthal coordinate of the position at which the ground point will enter the rotor plane of the UPR.

Preferably step (iii) includes controlling the phase of the cyclic pitch schedule as necessary such that the azimuthal position of the minimum blade pitch of the cyclic pitch schedule with respect to the rotor axis coincides with the azimuthal coordinate of the position in the rotor plane of the UPR at which the ground point will enter the rotor plane of the UPR, so that noise at that position is minimised.

The method may further comprise the steps of generating a calculated noise level for the ground point using at least the radial coordinate of the position at which the ground point will enter the rotor plane, comparing the calculated noise level to a threshold noise level and controlling or adjusting the phase of the cyclic pitch schedule if the calculated noise level exceeds the threshold noise level.

The method may comprise the steps of identifying two or more grounds points which will enter the rotor plane of the UPR, determining the azimuthal coordinates with respect to the rotor axis of the positions at which they will enter the rotor plane, and controlling the phase of the cyclic pitch schedule such that an azimuthal interval over which the blade pitch of the cyclic pitch schedule is below the average value thereof includes the azimuthal coordinates of the positions at which the ground points will enter the rotor plane of the UPR.

The method may comprise the steps of:

(i) determining two or more grounds points which will simultaneously enter the rotor plane of the unducted propulsive rotor;

(ii) calculating the radial and azimuthal coordinates of the respective positions in the rotor plane at which each of the two or more ground points will enter the rotor plane with respect to the rotor axis of the unducted propulsive rotor;

(iii) for each of the positions determined in step (ii) generating a respective calculated noise level for the ground point using at least the radial coordinate of the position;

(iv) for each position comparing the calculated noise level and the threshold noise level and determining that position for which the calculated noise level exceeds the threshold noise level by the greatest amount; and (v) outputting the control signal to the cyclic pitch mechanism such that the azimuthal position of the minimum blade pitch of the cyclic pitch schedule is equal to the azimuthal coordinate of the position determined in step (iv).

BRIEF DESCRIPTION OF THE DRAWINGS

Embodiments of the invention are described below by way of example only and with reference to the accompanying drawings in which.

DETAILED DESCRIPTION

Figure 1:
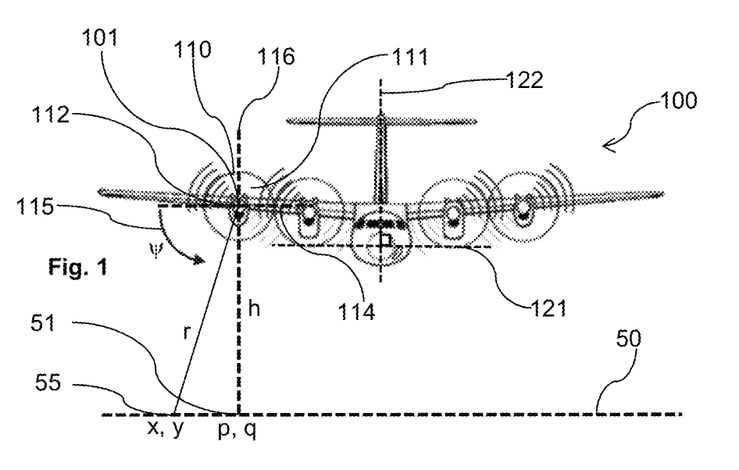
FIGS. 1 and 2 show front and side views respectively of an aircraft in level flight.
Figure 2:
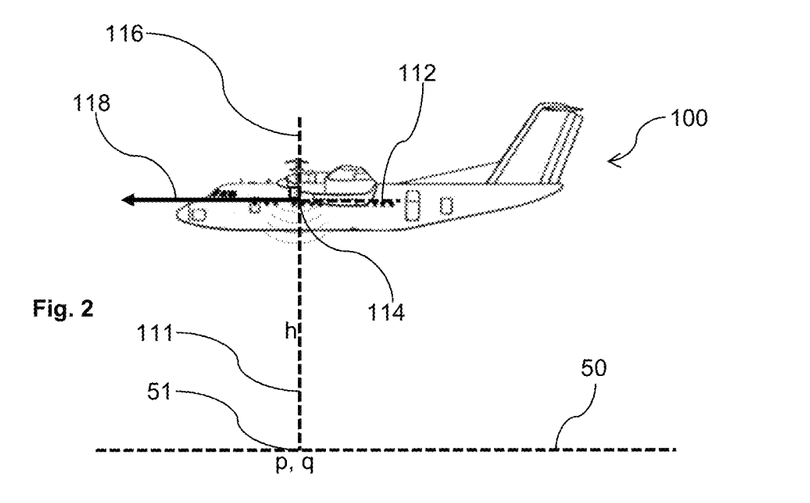

FIG. 1 shows a front view of an aircraft 100 in level forward flight. The aircraft 100 has four unducted propulsive rotors (UPRs), such as 110, each wing of the aircraft 100 mounting a respective pair of UPRs. The UPR 110 comprises a set of rotor blades mounted for rotation in a rotor plane 111 about a rotor axis 112. The other three UPRs are similar in structure, function, operation and effect to the UPR 110 and will not be described further. Axes 114, 116 in the rotor plane 111 each pass through the rotor axis 112 and are parallel to horizontal and vertical planes 121, 122 of the aircraft 100 respectively, the axes 114, 116 and planes 121, 122 being fixed in the frame of the aircraft 100. As depicted in FIG. 1, the rotor plane 111 is normal to the horizontal plane 121 of the aircraft 100. An azimuthal coordinate $\psi$ about the rotor axis 112 increases in the direction indicated by arrow 115 and has its origin ($\psi$=0) coincident with the axis 114. The rotor axis 112 has an altitude h above ground level 50 defined by a point 101 at which the rotor axis 112 meets the rotor plane 111. A point 51 on the ground immediately below the rotor axis 112 in the rotor plane 111 has a position p, q i.e. a latitude p and a longitude q. The intensity of noise generated by the UPR 110 and received at a point 55 in the rotor plane 111 with position x, y (at a radial position r from the rotor axis 112) may be required to be mitigated, for example if the position x, y lies within a populated area on the ground. FIG. 2 shows a side view of the aircraft 100. A forward-facing normal vector 118 to the rotor plane 111 coincides with the rotor axis 112. Since the aircraft 100 is in level flight, the normal vector 118 is parallel to the ground 50 as well as to the horizontal plane 121 of the aircraft 100. In other examples, the normal vector may not always be parallel to the horizontal plane of the aircraft, for example the rotor plane of a UPR of a VTOL tilt-wing aircraft is inclined to the horizontal plane of the aircraft when the aircraft is in transition between forward flight and a take-off or landing mode.

Figure 3:
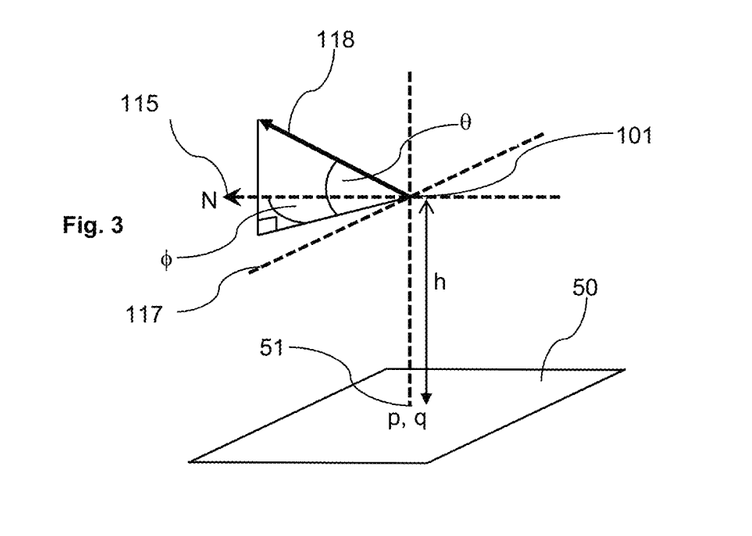
FIG. 3 illustrates the geometry of a rotor blade system of the FIG. 1 aircraft.
Figure 4:
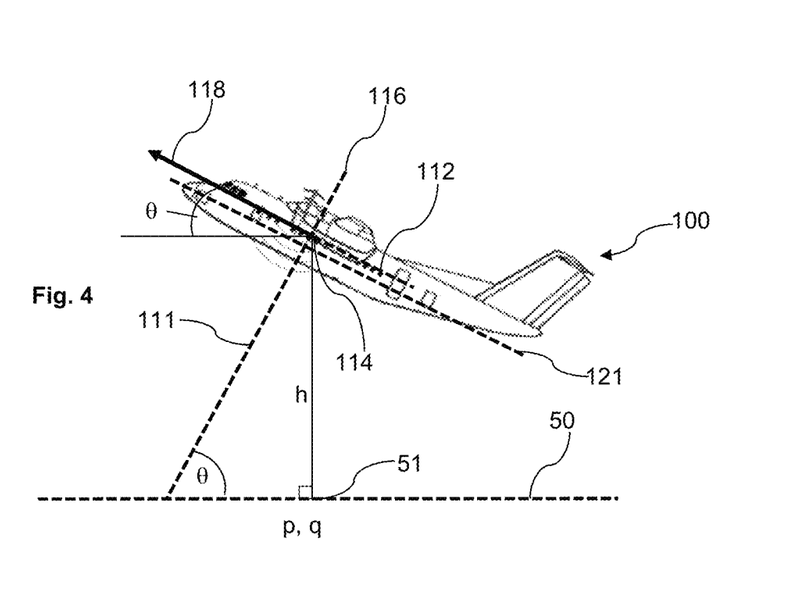
FIG. 4 shows a side view of the FIG. 1 aircraft with an upward pitch and zero roll.
Figure 5:
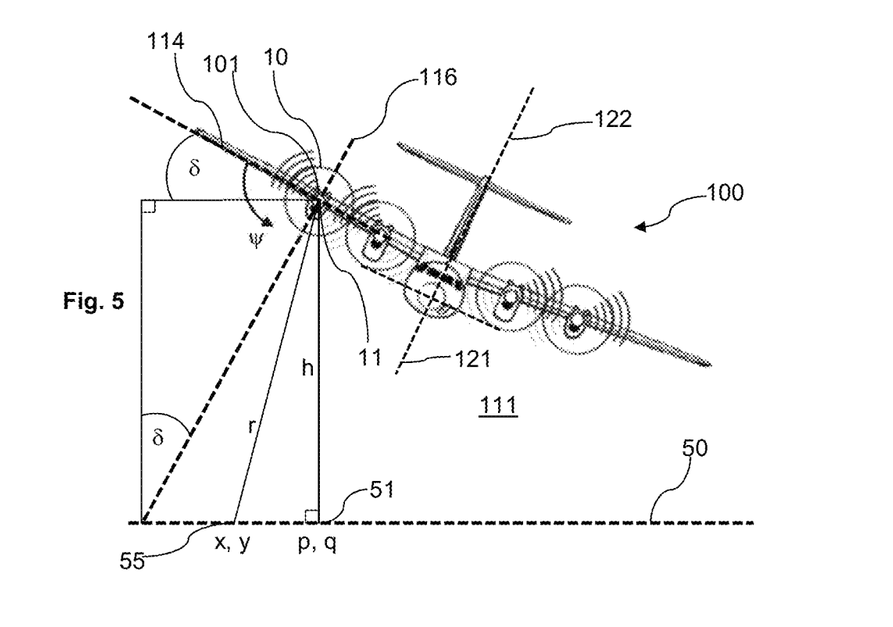
FIG. 5 shows a front view of the FIG. 1 aircraft with finite roll and zero pitch.

Referring additionally to FIG. 3, in general the forward-facing normal vector 118 has polar and azimuth angles $\theta$, $\phi$ with respect to axes 115, 117 which define north-south and east-west axes parallel to the ground plane 50. In FIG. 3 due north is indicated by N. Locations on the ground 50 which are most likely to be adversely affected by noise generated by the rotor 110 are those lying in the rotor plane 111 of the rotor 110; these locations depend in general on the orientation $\theta$, $\phi$ of the normal vector 118, the altitude h of the point 101 and the position p, q of the point 51 on the ground vertically below the point 101. FIG. 4 illustrates an example orientation of the normal vector 118 where $\theta \neq 0$ but $\phi = 0$. FIG. 5 shows an example orientation of aircraft 100 in which the aircraft 100 has a finite roll angle $\delta$ but the normal vector 118 is parallel to the ground plane 50. Locations on the ground which fall within the rotor plane 111 are the same as those in the case where the aircraft is in level flight (FIGS. 1 and 2); the radial position r of such a point is the same in either case, but the azimuthal coordinate $\psi$ is increased by $\delta$ compared the case shown in FIG. 1.

Figure 6:
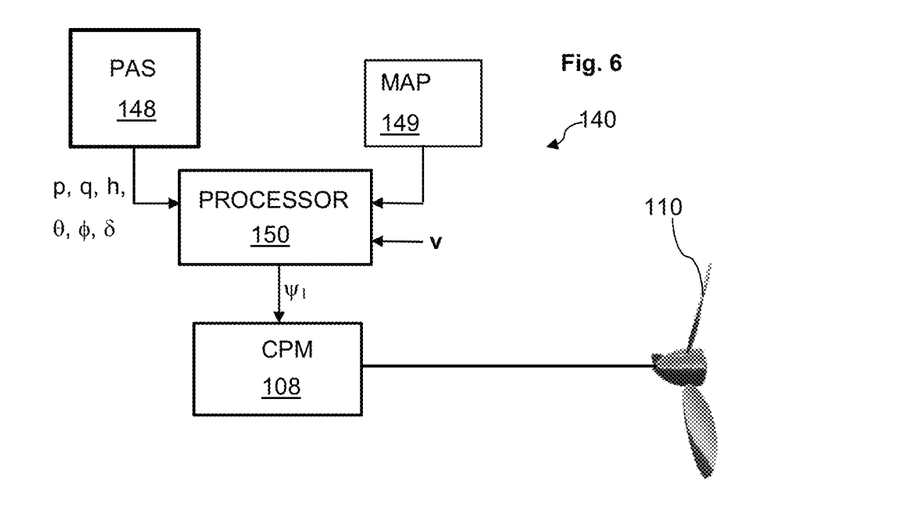
FIG. 6 schematically illustrates a noise mitigation system comprised in the aircraft of FIGS. 1, 2 and 4.
Figure 7:
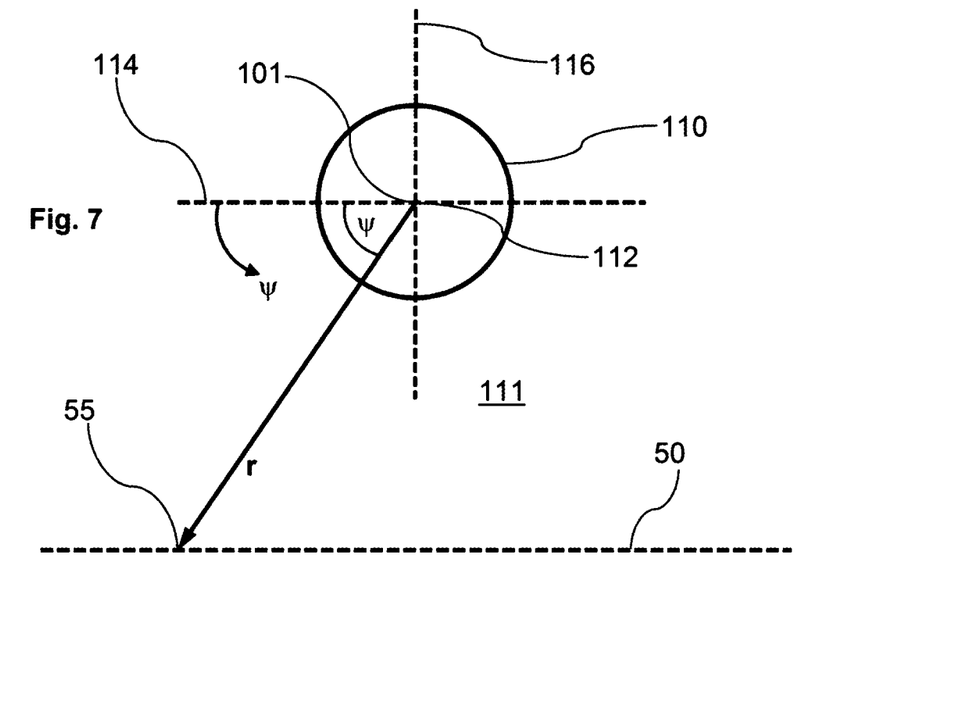
FIG. 7 is a diagram showing a ground point in relation to an unducted propulsive rotor of the FIG. 1 aircraft.

Referring additionally to FIG. 6, a noise mitigation system 140 comprised in the aircraft 100 for mitigating noise generated by the UPR 110 and received at one or more positions such as 55 on the ground 50 in the rotor plane 111 comprises a position and attitude system (PAS) 148, a memory 149, a processor 150 and a cyclic pitch mechanism 108 coupled to rotor blades of the UPR 110. The PAS 148 provides position and attitude data corresponding to the latitude, longitude and altitude h of the point 101 where the rotor axis 112 intersects the rotor plane 111, as well as the roll angle $\delta$ of the aircraft 100. The memory 149 stores a list of ground points x, y and a respective noise threshold value for each ground point x, y, the noise threshold value of a given ground point being the maximum acceptable noise level for that ground point. Data corresponding to the velocity vector v of the aircraft 100 is also input to the processor 150. Using position and attitude data from the PAS 148, the aircraft velocity v and data held in the memory 149, the processor 150 determines the set of ground points x, y which will fall within the rotor plane 111 of the UPR 110 following elapse of a period of time greater than or equal to the reaction time of the system 140, and the polar coordinates r, $\psi$ of positions at which they will enter the rotor plane 111. Referring to FIG. 7, for each such position x, y 55 predicted to fall within the rotor plane 111 after a period of time greater than or equal to the reaction time of the system 140, the processor 150 calculates the magnitude r of the position vector r from the axis 112 to the position within the rotor plane 111 at which the ground point x, y is expected to enter the rotor plane 111 of the UPR 110 and the noise level generated by the UPR 110 at that position in the rotor plane 111, based at least on the value of r. The determination of noise level at a given position r, $\psi$ in the rotor plane 111 may additionally take into account factors such as the current blade pitch for the azimuthal position $\psi$ and the angular velocity or RPM of the UPR 110. The processor 150 further determines those positions r, $\psi$ at which the calculated noise level from the UPR 110 exceeds the corresponding threshold noise value. If there is one such position, the processor 150 determines the azimuthal position $\psi$ of that position. Where there is more than one such position, the processor 150 determines the position r, $\psi$ at which the noise threshold value is exceeded by the greatest amount and the azimuthal coordinate $\psi$ of that ground position.

Figure 8:
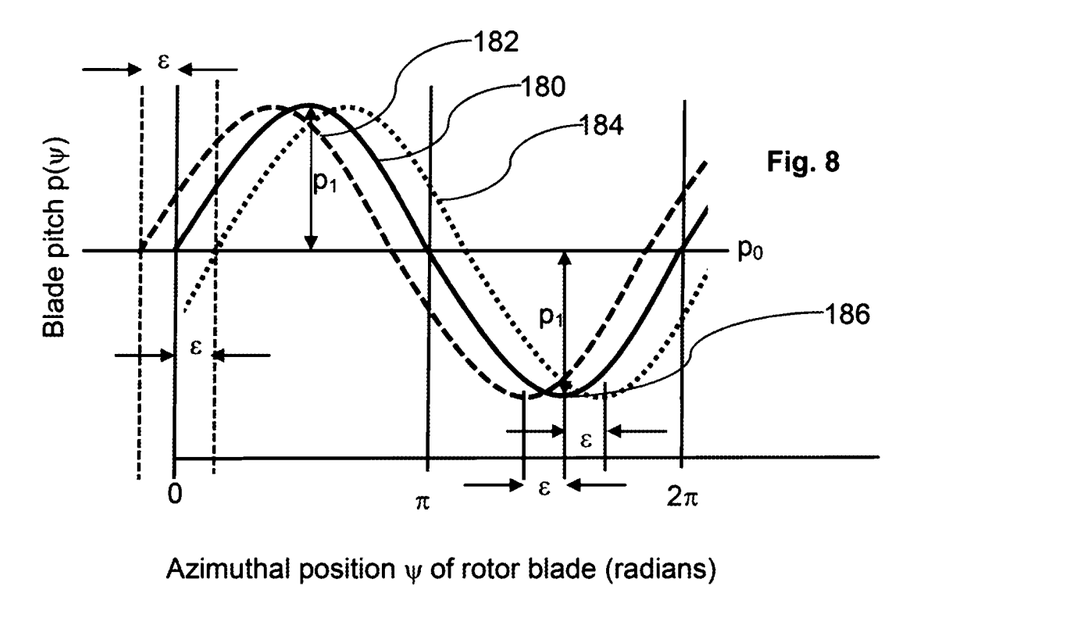
FIG. 8 illustrates adjustment of the phase of a sinusoidal cyclic pitch schedule for an unducted propulsive rotor.

The processor 150 then provides a control signal to the cyclic pitch mechanism 108 such that a sinusoidal cyclic pitch schedule p($\psi$) is applied to blades of the rotor 110. This means that the blade pitch of the rotor is changed from a collective pitch value $p_0$ which is not dependent on $\psi$ to a form $p(\psi)=p_0+p_1 \sin \psi$ where $p_1$ is a constant maximum pitch excursion or deviation from $p_0$. Referring to FIG. 8, a sinusoidal cyclic pitch schedule is indicated by curve 180. The blade pitch p(w) is below the average value $p_0$ of the blade pitch over the interval $\psi=\pi$ to $2\pi$ and above average over the interval 0 to $2\pi$. The blade pitch has maximum and minimum values $p_0 \pm p_1$ at $\psi=\pi/2$, $3\pi/2$ respectively. The processor 150 controls the cyclic pitch mechanism 108 to adjust the phase of the cyclic pitch schedule, for example a phase shift ε may be applied to generate advanced or retarded sinusoidal cyclic pitch schedules $p(\psi)=p_0+p_1 \sin (\psi \pm \varepsilon)$ 182, 184, ε being variable.

As described above, a single ground point x, y predicted by the processor 150 to enter the rotor plane 111 after a time period greater than or equal to the reaction time of the system 140, is identified by the processor 150, which then controls the cyclic pitch mechanism 108 by controlling the phase ε such that the minimum blade pitch value $p_0-p_1$ 186 occurs at the $\psi$ value which corresponds to the azimuthal coordinate $\psi$ of the identified ground point x, y when it enters the rotor plane 111. By reducing the value of the blade pitch $p(\psi)$ from the collective pitch value $p_0$ to the value $p_0-p_1$ at the azimuthal coordinate $\psi$ of the identified ground point x, y, the noise received at that ground point is reduced. The direction $\psi$ of the minimum blade pitch is thus steered by the processor 150 to coincide with the azimuthal coordinate $\psi$ of the identified ground point x, y in the rotor plane 111 of the UPR 110.

Since the blade pitch is increased over the range 0 to $\pi$ and reduced over the range $\pi$ to $2\pi$ compared to the collective pitch value $p_0$, the total thrust produced by the rotor 110 does not change significantly, although a net force on the rotor axis 112 is produced in the rotor plane 112. By imposing a cyclic pitch schedule on the rotor blades of the rotor 110 and arranging for the minimum blade pitch 186 to coincide in azimuth $\psi$ with the identified ground point x, y, ground noise mitigation at that ground point is achieved without changing the angular velocity (RPM) of the UPR 110. Changing the RPM of a UPR of an aircraft causes a tonal change which is particularly noticeable by, and annoying to, people on the ground and also changes the propulsive thrust of the UPR thus affecting the handling of the aircraft.

Provided the phase ε of the cyclic pitch schedule applied to the rotor blades of the rotor 110 is adjusted so that the blade pitch at an azimuthal position $\psi$ corresponding to the ground position x, y is below average, then noise generated by the rotor 110 and received at the position x, y is reduced compared to the case where rotor blades of the rotor 110 have a constant collective pitch $p_0$. It is not necessary that the azimuthal position of the minimum blade pitch 186 coincide with the azimuthal position of the position x, y in order for noise reduction at x, y to be achieved although maximum noise reduction is achieved when this is the case. For example, provided the phase ε of the cyclic pitch schedule is adjusted so that the azimuthal interval over which the blade pitch of the rotor 110 is below the average value of blade pitch includes the azimuthal position of a ground point x, y when in the rotor plane 111 then noise is reduced at that ground point since blade pitch is reduced from the collective value $p_0$ (even though not minimised) at the azimuthal position of the ground point x, y.

In the case where two or more ground points x, y are predicted to fall within the rotor plane 111 simultaneously after a time period greater than or equal to the reaction time of the system 140, the processor 150 may alternatively control the phase ε of the cyclic pitch schedule such that all such ground points lie within the azimuthal interval over which the blade pitch of the UPR 110 is below-average. If this is not possible, the processor 150 may control the cyclic pitch mechanism 108 such that the ground point for which the corresponding noise threshold is exceeded by the greatest amount lies within the azimuthal interval over which the blade pitch of the UPR 110 is below-average or corresponds to the minimum blade pitch of the cyclic pitch schedule. Alternatively the processor 150 may arrange for the azimuthal interval over which blade pitch is below average to include as many of the ground points projected to fall within the rotor plane 111 of the UPR 110 as possible.

Figure 9:
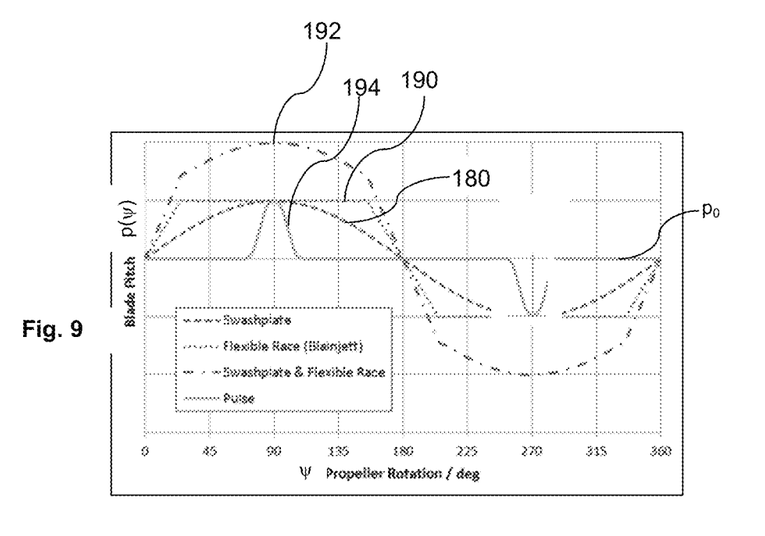
FIG. 9 illustrates cyclic pitch schedules with non-sinusoidal functional forms.

A sinsusoidal cyclic pitch schedule such as 180 may be applied to rotor blades of the rotor by employing a swashplate mechanism as the cyclic pitch mechanism 109. (Typically a helicopter employs a swashplate system to provide a sinusoidal cyclic pitch schedule to its rotor blades to effect lateral movement of the helicopter.) In other examples the cyclic pitch schedule is not sinusoidal. For example, referring to FIG. 9, the cyclic pitch schedule applied to the rotor blades of the rotor 110 may have the form of a quasi-square wave 190; a flexible race mechanism for achieving the cyclic pitch schedule 280 is described in U.S. Pat. No. 10,272,998. The average value of the pitch deviation $|p(\psi)-p_0|$ is greater over the intervals 0 to $2\pi$ and $\eta$ to $2\pi$ for the quasi square wave 190 than for the sinusoidal pitch schedule 180 for a given maximum pitch deviation from $p_0$. The cyclic pitch schedule indicated by curve 192 may be achieved by combining a swashplate with the flexible race arrangement described in U.S. Pat. No. 10,272,998. Curve 194 is another cyclic pitch schedule in which the magnitude of the blade pitch increases rapidly around $\pi/2$ and $3\pi/2$ but is otherwise zero (i.e. $p(\psi)=p_0$ away from $\pi/2$ and 3c/2). At and around 0, $\pi$, $2\pi$ the pitch deviation is zero, this being aerodynamically beneficial because the blade pitch is equal to the collective pitch value $p_0$ at the azimuthal position of the wing ($\psi=0$, $\pi$, $2\pi$).

Figure 10:
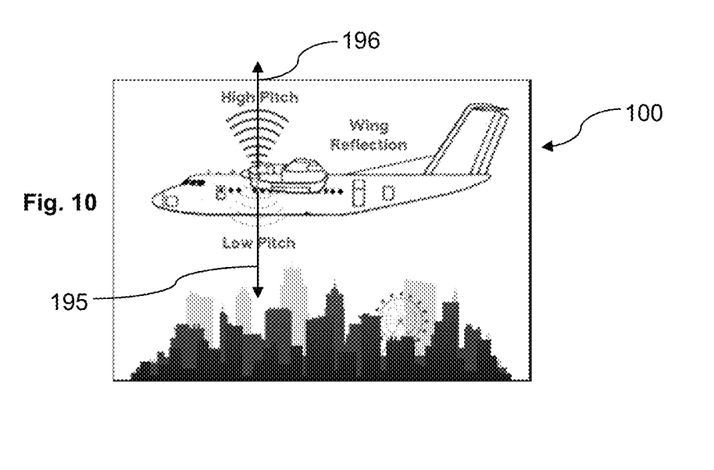
FIG. 10 shows an aircraft in level flight over a populated area.
Figure 11:
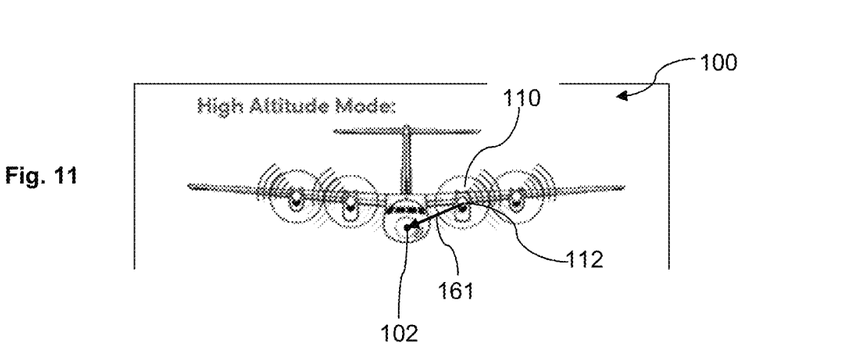
FIG. 11 shows the FIG. 10 aircraft at high altitude.

FIG. 10 shows the aircraft 100 in level flight (i.e. the horizontal plane 121 is parallel to the ground) at low altitude over a populated area. A cyclic pitch schedule is applied to the UPR 110 such that the azimuthal position at which the minimum value of blade pitch occurs corresponds to the vertically-downward direction 195 and the azimuthal position at which the maximum value of blade pitch occurs corresponds to the vertically-upward direction 196. The total thrust of the UPR 110 is approximately maintained with respect to the thrust for a constant collective blade pitch, but community noise is reduced. The RPM of the UPR 110 is not changed, thus avoiding changes in tonal noise. FIG. 11 shows the aircraft 100 in level flight when there are no grounds points stored in the memory 149 which are anticipated or predicted by the processor 150 to fall within the rotor plane 111 of the UPR 110. This typically occurs at high altitude and/or in regions where there are no populated areas. In this case the processor 150 may optionally control the cyclic pitch mechanism 108 such that the azimuthal position of the minimum value of blade pitch corresponds to a position vector 161 in the rotor plane 111 of UPR 110 from the axis 112 to the central longitudinal axis 102 of the aircraft 100. This arrangement minimises noise for passengers on board the aircraft 100. In this case the cyclic pitch mechanism may not operate to switch from a constant collective pitch mode to a cyclic pitch mode; the UPR 110 may always have a cyclic pitch schedule, only the phase of the schedule being adjusted by the processor to mitigate either community noise or noise experienced by passengers on board the aircraft 100 as required.

The invention claimed is:

1. A noise mitigation system for an unducted propulsive rotor of an aircraft, wherein the system comprises:
   a cyclic pitch mechanism arranged to apply a cyclic pitch schedule to rotor blades of the unducted propulsive rotor, the phase of the cyclic pitch schedule being adjustable and the blade pitch of the cyclic pitch schedule being below the average value thereof over a first azimuthal interval with respect to the rotor axis of the unducted propulsive rotor;
   a positioning and attitude system arranged to determine the position and attitude of the unducted propulsive rotor;
   a memory storing the position of a ground point;
   a processor arranged to carry out the steps of:
      (i) receiving input data corresponding to the position and attitude of the unducted propulsive rotor and the position of the ground point from the positioning and attitude system and the memory respectively;
      (ii) receiving input data corresponding to the velocity of the aircraft;
      (iii) determining from the input data that the ground point will enter the rotor plane of the unducted propulsive rotor after a time period greater than or equal to the reaction time of the system and calculate the radial and azimuthal coordinates of the position in the rotor plane at which the ground point will enter the rotor plane with respect to the rotor axis of the unducted propulsive rotor; and
      (iv) outputting a control signal to the cyclic pitch mechanism as necessary to adjust the phase of the cyclic pitch schedule such that the first azimuthal interval includes the azimuthal coordinate determined in step (iii).

2. A noise mitigation system according to claim 1 wherein the processor is arranged to output a control signal to the cyclic pitch mechanism to adjust the phase of the cyclic pitch schedule such that the azimuthal position of the minimum blade pitch of the cyclic pitch schedule is equal to the azimuthal coordinate determined in step (iii).

3. A noise mitigation system according to claim 1 wherein the memory stores threshold data corresponding to a threshold noise value associated with the ground point and the processor is arranged to carry out the steps of:
   (v) receiving the threshold data;
   (vi) generating a calculated noise level for the ground point using at least the radial coordinate of the position at which the ground point will enter the rotor plane; and
   (vii) comparing the calculated noise level to the threshold noise value;
and outputting the control signal to the cyclic pitch mechanism if the calculated noise value exceeds the threshold noise value.

4. A noise mitigation system according to claim 1 wherein the memory stores the positions of each of a plurality of ground points and wherein the processor is arranged to carry out the steps of:
   (i) receiving input data corresponding to the positions of each of the ground points;
   (ii) determining two or more grounds points which will simultaneously enter the rotor plane of the unducted propulsive rotor after a time period greater than or equal to the reaction time of the system;
   (iii) calculating the radial and azimuthal coordinates of the respective positions in the rotor plane at which each of the two or more ground points will enter the rotor plane with respect to the rotor axis of the unducted propulsive rotor; and
   (iv) outputting a control signal to the cyclic pitch mechanism as necessary to adjust the phase of the cyclic pitch schedule such that the first azimuthal interval includes the azimuthal coordinate of each of the positions.

5. A noise mitigation system according to claim 1 wherein the memory stores the positions of each of a plurality of ground points and threshold data corresponding to noise threshold values each of which corresponds to a respective ground point and wherein the processor is arranged to carry out the steps of:
   (i) receiving input data corresponding to the positions of each of the ground points and the threshold data;
   (ii) determining two or more grounds points which will simultaneously enter the rotor plane of the unducted propulsive rotor after a time period greater than or equal to the reaction time of the system;
   (iii) calculating the radial and azimuthal coordinates of the respective positions in the rotor plane at which each of the two or more ground points will enter the rotor plane with respect to the rotor axis of the unducted propulsive rotor;
   (iv) for each of the positions determined in step (ii) generating a respective calculated noise level using at least the radial coordinate of the position;
   (v) for each position comparing the calculated noise level and the threshold noise level and determining that position for which the calculated noise level exceeds the threshold noise level by the greatest amount; and
   (vi) outputting the control signal to the cyclic pitch mechanism such that the azimuthal position of the minimum blade pitch of the cyclic pitch schedule is equal to the azimuthal coordinate of the position determined in step (v).

6. A system according claim 1 wherein the control signal output by the processor to the cyclic pitch mechanism is arranged to change the pitch schedule of the unducted propulsive rotor from a constant collective pitch to a cyclic pitch schedule.

7. A system according to claim 1 wherein the processor and the memory are located remotely from the cyclic pitch mechanism and the unducted propulsive rotor and the system comprises means for wireless communication between the positioning and attitude system and the processor and between the processor and the cyclic pitch mechanism.

8. An aircraft comprising a noise mitigation system according to claim 1.

9. An aircraft according to claim 8 wherein the processor is arranged to adjust the phase of the cyclic pitch schedule such that the first azimuthal interval includes an azimuthal position corresponding to a position vector from the rotor axis of the unducted propulsive rotor in the rotor plane thereof to a point on the central longitudinal axis of the fuselage of the aircraft when the altitude of the aircraft is greater than a threshold altitude value.

10. An aircraft according to claim 9 wherein the processor is arranged to adjust the phase of the cyclic pitch schedule such that the azimuthal position of the minimum blade pitch of the unducted propulsive rotor corresponds to a position vector from the rotor axis of the unducted propulsive rotor in the rotor plane thereof to a point on the central longitudinal axis of the fuselage of the aircraft when the altitude of the aircraft is greater than the threshold altitude value.

11. A method of mitigating noise generated by an unducted propulsive rotor (UPR) of an aircraft, the method comprising the steps of:
(i) identifying a ground point which will enter the rotor plane of the UPR;
(ii) determining the azimuthal coordinate of the position in the rotor plane at which the ground point will enter the rotor plane with respect to the rotor axis of the UPR;
(iii) applying a cyclic pitch schedule to rotor blades of the UPR and controlling the phase of the cyclic pitch schedule as necessary such that an azimuthal interval over which the blade pitch of the cyclic pitch schedule is below the average value thereof includes the azimuthal coordinate of the position at which the ground point will enter the rotor plane of the UPR.

12. A method according to claim 11 wherein step (iii) includes controlling the phase of the cyclic pitch schedule as necessary such that the azimuthal position of the minimum blade pitch of the cyclic pitch schedule with respect to the rotor axis coincides with the azimuthal coordinate of the position in the rotor plane of the UPR at which the ground point will enter the rotor plane of the UPR.

13. A method according to claim 11 comprising the steps of generating a calculated noise level for the ground point using at least the radial coordinate of the position at which the ground point will enter the rotor plane, comparing the calculated noise level to a threshold noise level and controlling or adjusting the phase of the cyclic pitch schedule if the calculated noise level exceeds the threshold noise level.

14. A method according to claim 11 comprising the steps of identifying two or more grounds points which will enter the rotor plane of the UPR, determining the azimuthal coordinates with respect to the rotor axis of the positions at which they will enter the rotor plane, and controlling the phase of the cyclic pitch schedule such that an azimuthal interval over which the blade pitch of the cyclic pitch schedule is below the average value thereof includes the azimuthal coordinates of the positions at which the ground points will enter the rotor plane of the UPR.

15. A method according to claim 11 comprising the steps of:
(i) determining two or more grounds points which will simultaneously enter the rotor plane of the unducted propulsive rotor;
(ii) calculating the radial and azimuthal coordinates of the respective positions in the rotor plane at which each of the two or more ground points will enter the rotor plane with respect to the rotor axis of the unducted propulsive rotor;
(iii) for each of the positions determined in step (ii) generating a respective calculated noise level for the ground point using at least the radial coordinate of the position;
(iv) for each position comparing the calculated noise level and the threshold noise level and determining that position for which the calculated noise level exceeds the threshold noise level by the greatest amount; and
(v) outputting the control signal to the cyclic pitch mechanism such that the azimuthal position of the minimum blade pitch of the cyclic pitch schedule is equal to the azimuthal coordinate of the position determined in step (iv).

* * * * *